May 6, 1969

D. L. FRIED 3,443,100

APPARATUS FOR DETECTING MOVING BODIES BY PAIRED IMAGES

Filed Jan. 22, 1965

INVENTOR.
DAVID L. FRIED
BY
Sidney Magnes
AGENT

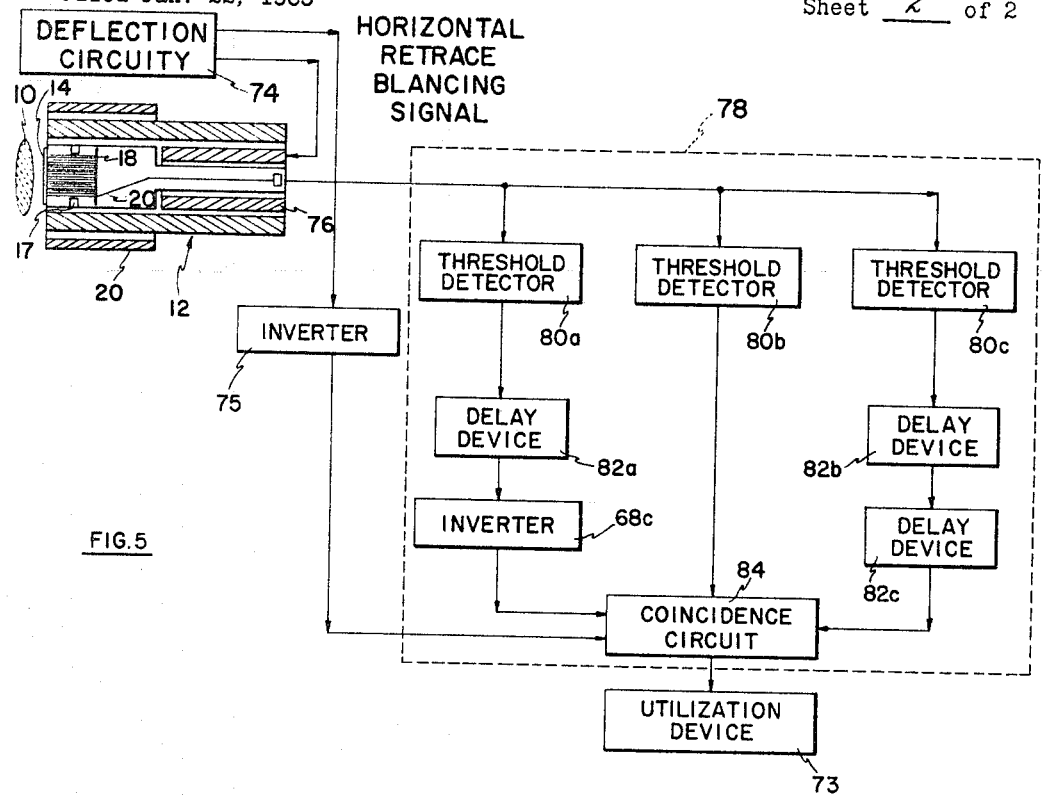
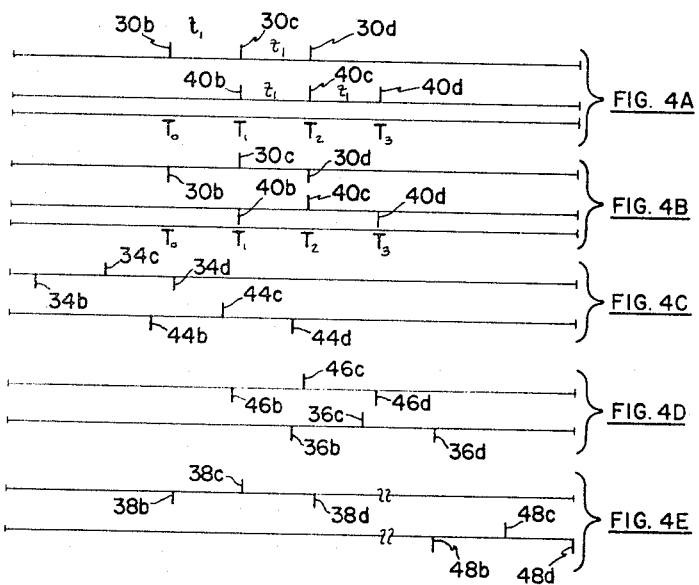

3,443,100
APPARATUS FOR DETECTING MOVING BODIES
BY PAIRED IMAGES
David L. Fried, Woodland Hills, Calif., assignor to
North American Rockwell Corporation
Filed Jan. 22, 1965, Ser. No. 427,245
Int. Cl. H01j 39/12; G02b 1/00; G01j 1/20
U.S. Cl. 250—206     11 Claims

ABSTRACT OF THE DISCLOSURE

This invention relates to the identification of moving targets; and more particularly to the identification of illuminated moving satellites. The composite star-satellite object-field is imaged onto a pickup tube to produce a primary image-field; and after a suitable time-interval is again imaged to produce a displaced image-field, so that each object has a double image. The pickup tube's output signal, corresponding to initial and displaced image-fields, is analyzed to determine whether any of the double-images have a displacement that differs from the intentional displacement. Suitable circuitry is used to detect abnormal displacements, these corresponding to a moving body.

---

One of the problems in satellite detection is that of distinguishing the moving satellite from the background of fixedly-positioned stars, since the satellite and the stars all appear as points of light, the difference being that the point of light corresponding to the satellite is moving very slowly. Most prior-art satellite-detection systems merely display the points of light, and depend upon a human observer to detect which point of light moved. This is not completely satisfactory, and automated systems were developed. Some automated systems record the relative positions of the various points of light on film, or in a similar manner; and then compare these relative positions with the relative positions of the points of light at an earlier or later time. Other automatic prior-art systems use an electron tube to convert the points of light into electric signals that represent the actual "coordinates" of the light spots; and then used a computer to record, store, and compare these coordinates with the coordinates of the light spots at an earlier or later time. The automatic prior-art systems of the first type require large, complex, long-time-interval delay-devices; and the systems of the second type require computers with large memories for recording, storing, and comparing information.

Objects and drawings

It is an object of the present invention to provide an improved moving-target indication.

It is another object of the present invention to provide a moving-target identification that does not require a distinct storage device, or complex computers.

The attainment of these objects and others will be realized from the teachings of the following specification, taken in conjunction of the drawings, of which FIGURE 1 is a schematic representation of apparatus for practicing the present invention;

FIGURES 4A–4E are a representation of the final time-signals that indicate the presence of a moving target; and FIGURE 5 illustrates another embodiment of the invention.

Summary

Broadly stated, the present invention comprises a pickup-type tube onto which a star-satellite object-field is imaged to produce a primary image-field. After a suitable time interval, the star-satellite object-field is imaged at a suitably-displaced location of the pickup-type tube, to produce a secondary image-field, so that each object has a double image—i.e., a primary and a secondary image. The tube then produces an output signal that corresponds to the composite image-fields. Fixedly-positioned objects, such as the stars, have their double images separated by a predetermined distance that depends upon the intentional displacement; whereas moving objects, such as satellites, have their double images separated by a distance that is a function of the satellite's velocity and the intentional displacement. The output signals from the tube are then analyzed, by means of simple short-time-interval delay-devices, to indicate which double images are spaced apart by a distance other than the predetermined displacement-distance intentionally introduced. Suitable apparatus discounts those double images that are separated by the intentionally-introduced predetermined distance, whereas the apparatus attracts attention to those double images that are separated by any distance other than the intentionally-introduced predetermined distance.

Detailed description

Figure 1:
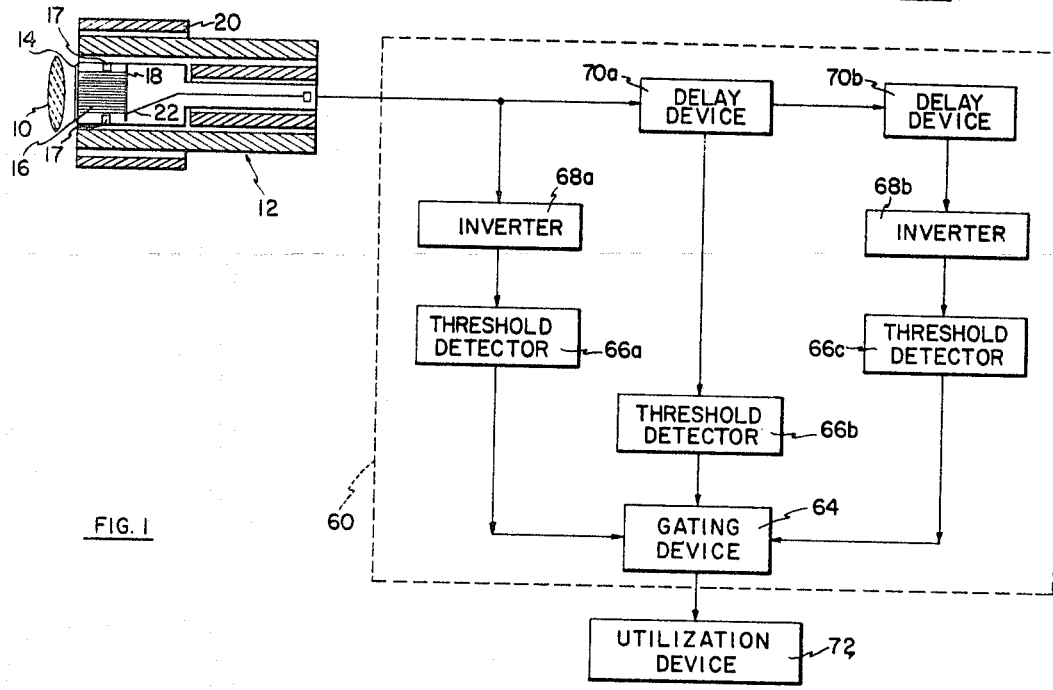

FIGURE 1 shows one embodiment of the invention wherein an optical system 10 encompasses a given field of view, and images the previously-discussed object-field of stars and satellites onto a pickup tube 12, to produce an "image-field." Pickup tube 12 is preferably of the image-orthicon type, wherein the external object-field is optically imaged onto a photosensitive-surface 14 that emits streams 16 of electrons. These are accelerated, by a signal applied to an acceleration electrode 17, so that they impinge onto an insulated or storage surface 18. In this way the optical image-field on the photosensitive-surface 14 is converted to an electronic image-field on the storage-surface 18.

In accordance with the present invention the tube 12, while still arranged to have the same object field imaged thereon by optical system 10, is shuttered for a suitable interval of time by suitable mechanical or electronic means, such as disabling the streams 16 of electrons by applying a cutoff signal to acceleration electrode 17 after which a magnetic displacement field is produced, by means such as coils 20 and a suitable energizing circuit. The resultant magnetic field displaces the streams 16 of electrons in a predetermined manner, so that the optical system, still encompassing the same field of view, now produces a displaced second electronic image-field on the storage-surface 18. These two electronic image-fields—being displaced in position relative to pickup tube 12, and being mutually displaced in time—thus form a composite double-image-field representing the external object-field at two distinct times, the inherent storage ability of storage surface 18 retaining the first image-field. The reading electron-beam 22 now scans the composite image-field in a well known manner to produce the output signals of pickup tube 12.

Alternatively, the image-field displacement may be produced by an electrostatic field, rather than a magnetic field. Other pickup tubes—such as the vidicon type—may be used despite the fact that they do not have a storage surface or an internal stream of electrons that can be displaced. In using these tubes, the optical system 10 may comprise a displacement element—such as a moveable mirror—that displaces the optical image-field in a predetermined manner. Under other conditions, the pickup tube may be physically moved, or the entire system pivoted to provide the secondary displaced image-field.

In any case, two picture-taking sequences, separated by a shuttered-interval, produce a primary image-field and a displaced secondary image-field, after which the pickup tube is activated to produce an output signal; satellite movement, if any, taking place during the shuttered-interval.

Figure 2A:
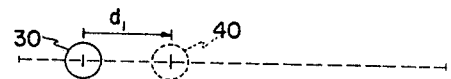
FIGURES 2A–2E show a representation of an image-field as produced by the present invention.
Figure 2B:
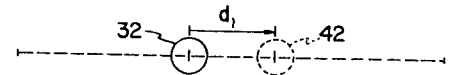
Figure 2C:
Figure 2D:
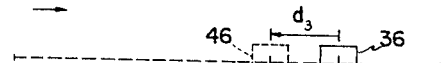
Figure 2E:
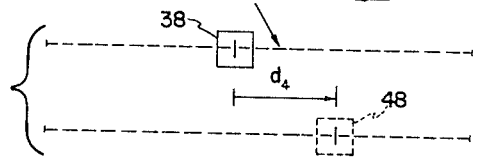

FIGURES 2A–2E represent a composite double-image-field. Here the solid-line circles 30 and 32 of FIGURE 2A and 2B represent two images that indicate the original location—in the primary image-field—of two fixedly-positioned stars; and the solid-line squares 34, 36, and 38 of FIGURES 2C, 2D, and 2E represent images that indicate the original locations—in the primary-image field—of three moving targets. The dark arrows adjacent squares 34, 36, and 38 indicate the direction of the target's movement. It will be noted that each individual image (circles and squares of FIGURES 2A–2E) is on a "scan" line produced as the reading electron beam of the pickup tube scans, or moves, from left to right; although it is not implied by FIGURES 2A–2E that any of the scan lines shown are necessarily adjacent to each other.

As previously indicated, after a given time-interval the apparatus produces a secondary image-field that is displaced a fixed distance; the displacement preferably being along a scan line, and in the direction of the scan—although as will be explained later, neither of these conditions is essential. The displaced secondary image-field represents the locations of the stars and satellites at a later instant.

As a result, the composite image-field of FIGURES 2A–2E now comprises (1) dotted-line circles 40 and 42 that represent the new locations of the fixedly-positioned stars, and (2) dotted-line squares 44, 46, and 48 that represent the new locations of the moving targets. It will be noted that—in FIGURES 2A and 2B—the separation $d_1$ of the paired images 30–40 and 32–42, corresponding to the fixedly-positioned stars, is the same. However, if a moving target happened to be moving in the direction of the displacement—as represented in FIGURE 2C—the separation $d_2$ of its paired-images 34 and 44 would be larger than the intentional displacement $d_1$. On the other hand, if a moving target happened to be moving in the opposite direction, the separation of its paired-images would tend to be smaller—rather than larger—than the intentional displacement. In those cases where a target happened to be moving at an extremely high velocity in the direction opposite to that of the intentional displacement, the resultant separation $d_3$—shown in FIGURE 2D—between its primary image 36 and its secondary image 46 might be in the opposite sense; i.e., the dotted-line square 46 might even appear on the opposite side of the solid-line square 36. Ordinarily though, a moving target would be moving at an angle to the scan line—as represented in FIGURE 2E—and its separation might be one or more lines, plus (or minus) the distance $d_4$.

Figure 3A:
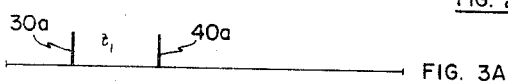
FIGURES 3A–3E show the time sequence of signals produced by the representation of FIGURES 2A–2E.

FIGURES 3A–3E represent the output signals of the pickup tube, the vertical lines of the individual figures representing the signals produced by the individual images of FIGURES 2A–2E. It should be noted that, for convenience, the signals are shown as narrow vertical lines; whereas, in reality the signals might be bell-shaped analog signals with superposed noise variations. It will be seen that the solid-line circle 30 and its displaced dotted-line circle 40 of FIGURE 2A produce two output signals, a primary signal 30a and a secondary signal 40a, shown in FIGURE 3A; the two output signals 30a and 40a corresponding to the primary and secondary images of a first fixedly-positioned star. Since the two images, 30 and 40 of FIGURE 2A are separated by a finite distance $d_1$, their resultant output signals 30a and 40a of FIGURE 3A are separated by a finite time, $t_1$, that corresponds to the intentional displacement $d_1$.

Figure 3B:
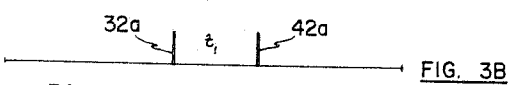

FIGURE 3B shows the primary and secondary output signals 32a and 42a produced by a second fixedly-positioned star of FIGURE 2B, these output signals also being separated by a time-interval $t_1$. In a similar manner, all fixedly positioned stars would produce paired primary and secondary output signals separated by a time-interval $t_1$.

Figure 3C:
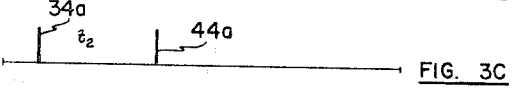

FIGURE 3C shows the primary and secondary output signals, 34a and 44a, produced by the first moving object, as represented by the squares 34 and 44 of FIGURE 2C. As shown in FIGURE 3C, the time-interval between output signals 34a and 44a is $t_2$, which is greater than $t_1$ because the target is moving in the direction of scan.

Figure 3D:
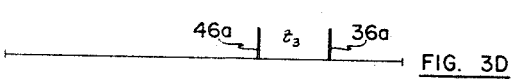

FIGURE 3D shows the primary and secondary output signals 36a and 46a produced by the second moving target, as represented by the squares 36 and 46 of FIGURE 2D. As shown in FIGURE 3D, the time interval between output signals 36a and 46a is $t_3$. If the target happened to be moving in a direction opposite to that of the scan, the resultant output signals 36a and 46a would tend to be closer together than if the target happened to be moving in the direction of the scan; but in the case of FIGURE 3D the primary and secondary signals 36a and 46a are actually reversed in position, because the target was assumed to be traveling very rapidly in a direction opposite of that of the scan.

Figure 3E:
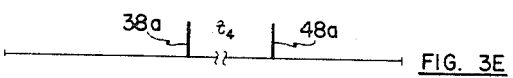

FIGURE 3E shows the primary and secondary output signals 38a and 48a produced by the third moving object as represented by squares 38 and 48 of FIGURE 2E. As indicated in FIGURE 3E, the time-interval between output signals 38a and 48a is $t_4$, which is quite large—as indicated by the line-breakage symbol—because the target is moving diagonally relative to the direction of the scan. The secondary image and the corresponding secondary signal would therefore appear on a different scan line.

Although the output signals shown in FIGURES 3A–3E are illustrated for simplicity as being on different lines, in actuality they form part of the continuous output signal of the cathode ray tube 12.

In accordance with the present invention, the pickup tube's paired primary and secondary output signals are analyzed to determine which paired signals are separated by a time-interval that differs from the predetermined time-interval $t_1$. This result is achieved, in the embodiment illustrated in FIGURE 1, by applying the output signals from pickup tube 12 to an identification circuit 60, where they traverse three different paths to reach a sensing, or gating-circuit, 64. The second, "main," path includes a single delay-line 70a, whose delay interval is equal to $t_1$—this being a very short time-interval that depends upon the intentionally-introduced displacement—and a threshold-detector 66b. The first path is a direct non-delayed one, and includes a threshold detector 66a and an inverter 68a. The third path includes an additional delay-line 70b whose delay is also equal to $t_1$, a third threshold-detector 66c, and a second inverter 68b. The operation of the threshold detectors and the inverters will be explained later.

FIGURE 4A shows the time-relation of the output-signals produced by the first fixedly-positioned star, as these signals reach coincidence circuit 64. Ignoring, for the moment, the operation of the threshold detectors and the inverters, primary signal 30a of FIGURE 3A traverses the second, main, path of FIGURE 1, experiencing a delay of $t_1$ in delay-line 70a; and reaches gating-circuit 64 at a time designated in FIGURE 4A as $T_1$, this "main" pulse being identified in FIGURE 4A by reference character 30c. Primary signal 30a also traverses the first non-delay path of FIGURE 1, reaching gating-circuit 64 at an earlier time designated as $T_0$, being shown as pulse 30b in FIGURE 4A. Primary signal 30a also traverses the third path of FIGURE 1, experiencing a delay of $t_1$ in delay-line 70a, plus a delay of $t_1$ in delay-line 70b, and reaches gating-circuit 64 at still later time designated as $T_2$, being shown in FIGURE 4A as pulse 30d. Thus, as shown in FIGURE 4A, gating-circuit 64 receives main pulse 30c, and fraternal pulses 30b and 30d; these pulses being separated by time-intervals equal to $t_1$ for a fixedly-positioned star.

The secondary signal 40a of FIGURE 3A starts at a time-interval $t_1$ after the first signal 30a. For the same reasons discussed above in connection with primary signal 30a, FIGURE 4A shows that the main secondary pulse 40c and the fraternal secondary pulses 40b and 40d reach gating-circuit 64 at times $T_2$, $T_1$, and $T_3$, respectively.

A slight digression is necessary at this point. It is well known that a gating-circuit may be such that it produces an output signal only when its input signal is not accompanied by an "inhibiting" signal; one arrangement requiring that the input signal is positive-going while the inhibiting signal is negative-going. This type of gating signal may take the form of a tetrode electron tube, the input signal being applied to the first grid, and the inhibit signal being applied to the second grid. In this way the simultaneous presence of an input signal and a negative-going inhibit signal will prevent the tetrode from producing an output signal, whereas the absence of an inhibit signal will result in an output signal. Moreover, the tetrode may be biased in such a way that the presence of an inhibit signal, by itself, will either (1) produce no output signal, or (2) produce an output signal of such polarity and/or amplitude that it is distinguishable from the output produced by a legitimate input signal. Other electronic or logic circuitry may of course be used to achieve the same result.

Referring back to FIGURE 1, it will be noted that the first and third paths contain inverters 68a and 68b respectively. As a result of the operation of these inverters, FIGURE 4B shows that fraternal pulses 30b, 30d, 40b, and 40d—which traversed the inverter-containing first and third paths—arrive at gating-circuit 64 with an inverted polarity; indicated by the fact that these fraternal pulses are represented by vertical lines that extend downwardly, whereas the main pulses 30c and 40c are represented by upwardly-extending vertical lines. Thus, fraternal pulses 40b and 30d act as inhibiting signals that prevent gating-circuit 64 from producing an output trigger signal; negative-going pulses 30b and 40d having no particular effect.

FIGURE 4B thus shows that at time $T_0$, gating-circuit 64 receives a negative-going fraternal pulse 30b, so it does not produce any trigger signal. At time $T_1$, gating-circuit 64 receives a positive-going main pulse 30c accompanied by a fraternal negative-going inhibiting pulse 40b, so it does not produce any trigger signal. At time $T_2$, gating-circuit 64 again receives an inhibiting negative-going fraternal pulse 30d that prevents gating-circuit 64 from producing a trigger signal. Also, at time $T_3$, gating-circuit 64 receives a negative-going fraternal pulse 40d, so again no trigger signal is produced. Thus, the pulses produced by fixedly-positioned stars are spaced apart by a predetermined time-interval, and each positive-going pulse is accompanied by an inhibiting pulse, so that gating-circuit 64 does not produce any trigger signal.

An analysis similar to that described above, will show that all fixedly-positioned stars will fail to produce a triggering signal from gating-circuit 64. Thus, by failing to produce a trigger signal, the disclosed apparatus discounts the presence of fixedly-positioned stars.

Consider now the situation of a moving target as represented by squares 34 and 44 of FIGURE 2C, and output signals 34a and 44a of FIGURE 3C. FIGURE 4C shows output signals 34b, 34c, and 34d spaced $t_1$ apart due to the passage of output primary signal 34a through the three paths of FIGURE 1; and shows output signals 44b, 44c, and 44d spaced $t_1$ apart, signals 44b and 44d being suitably inverted, due to the passage of output signal 44 through the three paths of FIGURE 1. It will be noted in FIGURE 4C that pulses 34b, 34d, 44b, and 44d are negative-going signals; and, as previously indicated, will not cause gating-circuit 64 to produce a trigger signal. However, positive-going main pulses 34c and 44c—which traverse the second path of FIGURE 1— are not accompanied by inhibiting negative-going signals, and each will therefore cause gating-circuit 64 to produce a trigger signal that is applied to a utilization device 72 of FIGURE 1. This device may sound an alert; energize various pieces of equipment; provide signals for a number of different purposes; aim cameras; compute the velocity and direction of the moving target, or achieve other desired effects.

FIGURE 4D shows the output signals 36b, 36c, 36d, 46b, 46c, and 46d resulting from the moving target represented in FIGURE 2D. It will be noted from FIGURE 4D that the negative-going pulses 46b, 46d, 36b, and 36d will not produce a trigger signal; but that positive-going pulses 46c and 36c are not accompanied by inhibiting signals. Thus gating-circuit 64 will produce trigger signals—even though the secondary output signal 46a of FIGURE 3D occur earlier than the primary signal 36a.

FIGURE 4E shows the output signals 38b, 38c, 38d, 48b, 48c, and 48d resulting from the moving target represented in FIGURE 2E. It will be noted from FIGURE 4E that the positive-going pulses 38c and 48c will produce trigger signals, even though the target was moving at an angle to the scan lines.

It may thus be seen that only fixedly-positioned stars produce paired double images separated by a predetermined distance, and that these do not produce trigger signals at gating-circuit 64; whereas moving targets produce double images separated by a distance that differs from the predetermined distance, and that these produce trigger signals that may be applied to a utilization device.

Alternatively, of course, the gating-circuit may be one wherein the inhibiting fraternal pulses may be of the same polarity as the main pulses.

Under certain conditions an electronic circuit produces spurious "noise" signals. Due to their transient nature, these noise signals ordinarily will not be present at the time necessary to produce a secondary displaced signal; thus, they may not produce properly timed inhibiting signals, and may therefore be interpreted as a moving target. In order to minimize this possibility, threshold-detectors 66a, 66b, and 66c are inserted into each path of the identification circuit 60 of FIGURE 1. These threshold-detectors may comprise a suitably biased diode that becomes conductive only when the applied signal exceeds a given value, in this way minimizing the possibility that a low-amplitude noise-signal may be interpreted as a moving target. A high-amplitude noise-signal would still produce a trigger signal, but utilization device 72 of FIGURE 1 would contain equipment to check the trigger signals to assure that only repetitive trigger signals, as produced by an actual moving target, would sound an alert.

It was previously indicated that the first and third paths produced the inhibit signals that prevented the gating-circuit from producing a trigger signal when a positive-going signal was present in the main path. If the threshold detectors 66a and 66c in the first and third paths happened to be set too high, because of a small amount of noise, they might prevent the passage of an inhibiting signal, even though one is present. To avoid this situation, it is preferable that the first and third threshold detectors 66a and 66c be set to a lower value than the second threshold detector 66b.

It was also previously indicated that the displacement was preferably, but not necessarily, in the direction of scan. It may now be seen that if the image of a fixedly-positioned star is displaced in the direction opposite that of the scan, the resultant primary and secondary signals will still prevent the production of a trigger signal.

If however, the displacement were vertical to locate the secondary image on a different scan line, rather than parallel to the direction of the scan, this would make the time-interval $t_1$ at least as long as the line-scan time interval, and would require larger delay-elements 70a and 70b.

It will be recalled that, in the case of a fixedly-positioned star, each pulse that traversed the main path of FIGURE 1 had to be accompanied by an inhibiting pulse that traversed the first or the third path of FIGURE 1, in order to prevent the production of a trigger signal. In some instances, a primary pulse may be produced by an image that happened to be adjacent to the edge of the image-field; but the intentionally-produced displacement might cause the secondary-image to be off-screen. In this case the secondary-image would fail to produce an inhibiting signal, so that an erroneous trigger signal would be produced. Referring back to FIGURE 1, it will also be noted that delay-devices 70a and 70b act upon analog signals received from the pickup tube 12.

To avoid these two conditions, the embodiment shown in FIGURE 5 may be used; this embodiment (1) providing an extra inhibit signal that prevents an edge-located image from being interpreted as a moving target, and (2) also permits the delay-devices to act upon digital-type signals.

FIGURE 5 shows a somewhat different identification circuit 78. Here the analog output from the pickup tube 12 is applied to threshold circuits 80a, 80b, and 80c, which produce output pulses when the input signals reach a predetermined magnitude. The threshold circuits may take the form of Schmitt-trigger circuits, which thus convert the analog input signals to digital output signals of fixed voltage values. The output signal from threshold circuit 80a is applied through a delay device 82a—which thus handles digital signals, rather than analog signals—and through an inverter 68c to a sensing circuit 84, to produce a main pulse. Since circuit 84 handles digital signals, it may be any one of the well known types of coincidence circuits that are used in computers. The digital output signal from threshold circuit 80b is applied directly to coincidence-circuit 84. Similarly, the digital output of threshold circuit 80c is applied through two delay devices 82b and 82c to coincidence-circuit 84. These latter output signals are the inhibiting fraternal pulses.

It will be noted that in FIGURE 5 the coincidence-circuit 84 receives a negative-going main signal from inverter 68c, and that the inhibit signals are positive-going. The operation is, however, basically the same as described above; namely, fixedly-positioned stars produce paired pulses that do not provide a trigger signal, whereas moving targets fail to provide the necessary inhibiting signals, and thus do produce a trigger signal.

FIGURE 5 also shows a block 74 entitled deflection circuitry, whose output is ordinarily applied to the deflection coil 76 of pickup tube 12 in order to deflect the electron beam 20. As is well known, the deflection circuitry produces various signals that—among other functions—blank out the "retrace" portions of the scan, as by applying a negative-going blanking signal to the electron-beam producing structure of the pickup tube 12. Ordinarily, these blanking signals establish the horizontal and vertical edges of the raster. In FIGURE 5, the horizontal-retrace blanking signal, from the deflection circuitry 74, is applied through an inverter 75 to coincidence-circuit 84. In FIGURE 5 this blanking signal inhibits the coincidence-circuit 84 against the presence of these primary images that are so close to the edges of surface 18 that they would produce an off-screen secondary-image that might permit the production of an erroneous trigger signal. In this way, an edge-located fixedly-positioned star will not produce an erroneous trigger signal. Actually, neither an edge-positioned star nor an edge-positioned moving target will produce any signal; but, in the case of the star, no harm will be done, whereas in the case of a moving target, it will soon move into the non-blanked portion of the raster.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. The combination comprising:
 means for producing a primary image-field;
 means for producing a secondary image-field displaced from said primary image-field by a predetermined amount—whereby every primary-field image has a paired secondary-field image; and
 means for determining whether any paired images of said primary and secondary image-field are separated by any other than said predetermined amount.

2. The combination comprising:
 means for causing an object-field to produce a primary image-field;
 means for causing said object-field to produce a secondary image-field displaced from said primary image-field by a predetermined amount, said primary and secondary image-field defining a composite image-field; and
 means for ignoring all paired images of said composite image-fields that are separated by said predetermined amount.

3. The combination comprising:
 means for causing an object-field, that contains at least one fixedly-positioned object and may contain a moving object, to produce a primary image-field;
 means for causing said object-field to produce a secondary image-field displaced from said primary image-field by a predetermined amount;
 means for converting the primary and secondary images of said primary and secondary image-fields into paired electrical signals; and
 means for determining whether any of said paired electrical signals are spaced apart by a time-interval other than the time-interval corresponding to the intentionally-introduced displacement.

4. The combination comprising:
 pickup means;
 means for causing an object-field, that contains at least one fixedly-positioned object and may contain one moving object, to produce a primary image field on said pickup means;
 means for causing said object field to produce a secondary image-field spaced from said primary image-field by predetermined amount, said primary and secondary image-fields defining a composite image-field that contains paired images for objects in said object field;
 means for causing said pickup means to produce an output signal corresponding to the paired images of said composite image-field, said output signal comprising paired electrical signals corresponding to the paired images of each object of said object-field; and means for determining the presence of an abnormal time-interval separating the primary and secondary signals of each pair of signals.

5. A moving target indication comprising:

means for causing an object-field, that contains at least one fixedly-positioned object and may contain a moving object, to produce a composite image-field comprising paired-images;

means for causing each of said paired-images to produce a main pulse and a fraternal pulse; and means for causing said fraternal pulses to negate said main pulses in the case of a fixedly-positioned object, and to fail to negate said main pulses in the case of a moving object.

6. A moving target indication comprising:

means for causing an object-field to produce a composite image-field comprising paired-images for each object of said object-field, said paired-images being separated by a predetermined amount;

means for causing each of said paired-images to produce a main pulse and a pair of fraternal pulses, the time-interval between said main and fraternal pulses corresponding to said predetermined amount; and means for causing said fraternal pulses to negate said main pulses in the case of a fixedly-positioned object, and to fail to negate said main pulses in the case of a moving object.

7. A moving target indication comprising:

(A) means for converting an object-field to a primary image-field;

(B) means for producing a secondary image-field displaced from said primary field, thus producing a composite image-field comprising paired-images wherein the paired-images of fixedly-positioned objects are separated by a given amount, and the paired-images of moving objects are separated by a different amount;

(C) means for producing paired output signals corresponding to said paired-images, the paired output signals corresponding to a fixedly-positioned object being separated by a predetermined time-interval corresponding to said intentionally-introduced displacement, and the paired output signals corresponding to a moving object being separated by a different time-interval;

(D) an identification circuit comprising:
  (1) paths causing each output signal to produce a main pulse and a fraternal pulse;
  (2) a sensing circuit comprising means for causing a fraternal pulse corresponding to a fixedly-object to cancel the effect of a main pulse applied to said sensing circuit, and for causing a fraternal pulse corresponding to a moving object to fail to cancel the effect of a main pulse applied to said sensing circuit, to cause said sensing circuit to produce a trigger pulse for each moving object.

8. A moving target indication comprising:

(A) a pickup tube;

(B) means for causing said pickup tube to convert an object-field to a primary image-field;

(C) means, associated with said pickup tube, for producing a secondary image-field displaced a given amount from said primary image-field, thus producing a composite image field comprising paired-images wherein the paired images of fixedly-positioned objects are displaced by a given amount;

(D) means for causing said pickup tube to produce paired output signals corresponding to said paired-images, the paired output signals corresponding to fixedly-positioned objects, and being separated by a time interval corresponding to said intentionally-introduced displacement;

(E) an identification circuit comprising:
  (1) a single-delay path for producing a main pulse, a non-delay path for producing a first fraternal pulse, and a double-delay path for producing a second fraternal pulse;
  (2) means for directing said output signals into said paths;
  (3) means for causing said main pulse to have a polarity opposite the polarity of said fraternal pulses;
  (4) a sensing circuit for causi ngthe fraternal pulses corresponding to a fixedly-positioned object to cancel the effect of the main pulses applied to said coincidence circuit, and for causing the fraternal pulses corresponding to a moving object to fail to cancel the effect of the main pulse applied to said coincidence circuit;
  (5) means for causing said coincidence circuit to produce a trigger pulse in response to the un-cancelled main pulse corresponding to a moving object.

9. A moving target indication comprising:

(A) a pickup tube;

(B) means for causing said pickup tube to convert an optical object-field to an electronic primary image-field by means of electron streams;

(C) magnetic displacement means, associated with said pickup tube, for displacing the electron streams to form a secondary electronic image-field displaced a given amount from said primary electronic image-field, thus producing a composite image-field comprising paired-images wherein the paired images of fixedly-positioned objects are displaced by a given amount;

(D) means for causing the reading beam of said pickup tube to produce paired output signals corresponding to said paired-images, the paired output signals corresponding to fixedly-positioned objects, and being separated by a time interval corresponding to said intentionally-introduced displacement;

(E) an identification circuit comprising:
  (1) a single-delay path for producing a main pulse, a non-delay path for producing a first fraternal pulse, and a double-delay path for producing a second fraternal pulse;
  (2) means for directing said output signals into said paths;
  (3) means for causing said main pulse to have a polarity opposite the polarity of said fraternal pulses;
  (4) a sensing circuit comprising means for causing the fraternal pulses corresponding to a fixedly-positioned object to cancel the effect of the main pulses applied to said sensing circuit and for causing the fraternal pulses corresponding to a moving object to fail to cancel the effect of the main pulses applied to said sensing circuit;
  (5) means for causing said coincidence circuit to produce a trigger pulse in response to the un-cancelled main pulse corresponding to a moving object.

10. Moving target indicating apparatus comprising:

an optical-to-electrical conversion device having an image-forming storage surface;

means for obtaining on said device two images from a given field of view, said images being mutually displaced in position relative to said device, and mutually displaced in time; and output means, responsive to said device, for providing an output signal for all images on said device except those that are displaced from another by a predetermined amount.

11. Moving target apparatus comprising:
an optical-to-electrical device having an image-forming storage surface;
means for successively forming on the storage surface of said device two images from a given field of view, said images being mutually displaced in position relative to said surface;
output means, responsive to said device, for providing an output signal for all images on said surface except those that are displaced from another by a predetermined amount.

References Cited

UNITED STATES PATENTS

| 2,967,449 | 1/1961 | Weiss | 88—1 |
| 3,039,002 | 6/1962 | Guerth | 250—203 |
| 3,336,585 | 8/1967 | Macovski | 250—221 |

RALPH G. NILSON, *Primary Examiner.*

T. N. GRIGSBY, *Assistant Examiner.*

U.S. Cl. X.R.

88—1; 250—203, 221